(12) United States Patent
Eberhardt et al.

(10) Patent No.: US 12,181,384 B2
(45) Date of Patent: *Dec. 31, 2024

(54) AUTOMATED SAMPLE PROCESSING SYSTEM

(71) Applicant: Beckman Coulter, Inc., Brea, CA (US)

(72) Inventors: Michael Eberhardt, Munich (DE); Charles Martinez, Yorba Linda, CA (US); Kathleen Payne, Zionsville, IN (US); Christoph Welte, Senden (DE); Bernd Wiedemann, Mering (DE)

(73) Assignee: Beckman Coulter, Inc., Brea, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 17/528,016

(22) Filed: Nov. 16, 2021

(65) Prior Publication Data

US 2022/0074825 A1 Mar. 10, 2022

Related U.S. Application Data

(63) Continuation of application No. 14/074,069, filed on Nov. 7, 2013, now Pat. No. 11,454,574.

(Continued)

(51) Int. Cl.
*G01N 1/28* (2006.01)
*G01N 35/00* (2006.01)

(52) U.S. Cl.
CPC .......... *G01N 1/28* (2013.01); *G01N 35/0092* (2013.01); *G01N 2035/0094* (2013.01)

(58) Field of Classification Search
None
See application file for complete search history.

(56) References Cited

U.S. PATENT DOCUMENTS

| 5,737,498 A | 4/1998 | Murray |
| 6,355,488 B1 | 3/2002 | Rousseau et al. |

(Continued)

FOREIGN PATENT DOCUMENTS

| CN | 1234869 A | 11/1999 |
| CN | 101918848 A | 12/2010 |

(Continued)

OTHER PUBLICATIONS

"U.S. Appl. No. 14/074,069, 312 Amendment filed Aug. 22, 2017", 6 pgs.

(Continued)

*Primary Examiner* — Lisa M Caputo
*Assistant Examiner* — Cynthia L Davis
(74) *Attorney, Agent, or Firm* — FROST BROWN TODD LLP

(57) ABSTRACT

One embodiment of the invention is directed to a method comprising receiving instruction data relating to a sample in a sample container. The method includes generating, by at least one processor using a workflow management layer, a process plan for the sample, and providing the process plan to a process control layer. The process plan comprises a plurality of possible routes. The method also comprises selecting, by the at least one processor using the process control layer, an optimized route within the plurality of possible routes in the process plan, and providing the optimized route to a middleware control layer. The at least one processor and middleware control layer are operable to cause a transport system to proceed along the selected route.

20 Claims, 7 Drawing Sheets

Related U.S. Application Data

(60) Provisional application No. 61/723,736, filed on Nov. 7, 2012.

(56) References Cited

U.S. PATENT DOCUMENTS

| | | | |
|---|---|---|---|
| 6,546,364 | B1 | 4/2003 | Smirnov et al. |
| 6,581,012 | B1 | 6/2003 | Aryev et al. |
| 6,721,615 | B2 | 4/2004 | Fava et al. |
| 7,937,655 | B2 | 5/2011 | Teng et al. |
| 2002/0138543 | A1 | 9/2002 | Teng et al. |
| 2002/0147515 | A1 | 10/2002 | Fava et al. |
| 2004/0098151 | A1 | 5/2004 | Carlucci et al. |
| 2004/0103073 | A1 | 5/2004 | Blake et al. |
| 2005/0036912 | A1 | 2/2005 | Yamakawa et al. |
| 2006/0148063 | A1 | 7/2006 | Fauzzi et al. |
| 2007/0143074 | A1 | 6/2007 | Gallestey et al. |
| 2007/0196909 | A1* | 8/2007 | Showalter .............. G06Q 10/06 435/283.1 |
| 2007/0254277 | A1 | 11/2007 | Scrabeck et al. |
| 2008/0113440 | A1 | 5/2008 | Gurney et al. |
| 2008/0235055 | A1 | 9/2008 | Mattingly et al. |
| 2012/0109531 | A1* | 5/2012 | Knafel .............. G05B 19/41865 702/19 |
| 2012/0129673 | A1 | 5/2012 | Fukugaki et al. |
| 2012/0159494 | A1 | 6/2012 | Shafiee et al. |
| 2012/0324454 | A1 | 12/2012 | Gounares et al. |
| 2013/0022499 | A1 | 1/2013 | Mizumoto et al. |
| 2013/0125675 | A1 | 5/2013 | Muller et al. |
| 2014/0129172 | A1 | 5/2014 | Eberhardt et al. |
| 2014/0305227 | A1 | 10/2014 | Johns |
| 2015/0276774 | A1 | 10/2015 | Pollack |
| 2015/0324520 | A1 | 11/2015 | Aykroyd et al. |

FOREIGN PATENT DOCUMENTS

| | | | |
|---|---|---|---|
| EP | 2450711 | A1 | 5/2012 |
| WO | WO-9003618 | A1 | 4/1990 |
| WO | WO-9812654 | A2 | 3/1998 |
| WO | WO-2009068555 | A1 | 6/2009 |
| WO | WO-2012012779 | A2 | 1/2012 |
| WO | WO-2012090795 | A1 | 7/2012 |
| WO | WO-2013070756 | A2 | 5/2013 |
| WO | WO-2014074684 | A2 | 5/2014 |
| WO | WO-2014074684 | A3 | 7/2014 |

OTHER PUBLICATIONS

"U.S. Appl. No. 14/074,069, Advisory Action mailed mailed Aug. 5, 2019", 4 pgs.
"U.S. Appl. No. 14/074,069, Appeal Brief filed Jun. 2, 2021", 42 pgs.
"U.S. Appl. No. 14/074,069, Appeal Decision mailed mailed Mar. 23, 2022", 10 pgs.
"U.S. Appl. No. 14/074,069, Examiner Interview Summary mailed Apr. 1, 2020", 3 pgs.
"U.S. Appl. No. 14/074,069, Examiner Interview Summary mailed Jun. 15, 2016", 3 pgs.
"U.S. Appl. No. 14/074,069, Examiner Interview Summary mailed Jul. 19, 2019", 3 pgs.
"U.S. Appl. No. 14/074,069, Examiner's Answer to Appeal Brief mailed Jul. 26, 2021", 34 pgs.
"U.S. Appl. No. 14/074,069, Final Office Action mailed Feb. 4, 2020", 29 pgs.
"U.S. Appl. No. 14/074,069, Final Office Action mailed Feb. 8, 2021", 39 pgs.
"U.S. Appl. No. 14/074,069, Final Office Action mailed Apr. 19, 2019", 34 pgs.
"U.S. Appl. No. 14/074,069, Final Office Action mailed May 21, 2018", 28 pgs.
"U.S. Appl. No. 14/074,069, Non Final Office Action mailed Mar. 2, 2016", 15 pgs.
"U.S. Appl. No. 14/074,069, Non Final Office Action mailed Jul. 10, 2020", 32 pgs.
"U.S. Appl. No. 14/074,069, Non Final Office Action mailed Jul. 12, 2016", 10 pgs.
"U.S. Appl. No. 14/074,069, Non Final Office Action mailed Aug. 30, 2019", 25 pgs.
"U.S. Appl. No. 14/074,069, Non Final Office Action mailed Nov. 26, 2018", 42 pgs.
"U.S. Appl. No. 14/074,069, Non Final Office Action mailed Dec. 14, 2016", 12 pgs.
"U.S. Appl. No. 14/074,069, Non Final Office Action mailed Dec. 22, 2017", 29 pgs.
"U.S. Appl. No. 14/074,069, Notice of Allowance mailed May 22, 2017", 10 pgs.
"U.S. Appl. No. 14/074,069, Response filed Feb. 26, 2019 to Non Final Office Action mailed Nov. 26, 2018", 14 pgs.
"U.S. Appl. No. 14/074,069, Response filed Mar. 10, 2017 to Non Final Office Action mailed Dec. 14, 2016", 6 pgs.
"U.S. Appl. No. 14/074,069, Response filed Mar. 22, 2018 to Non Final Office Action mailed Dec. 22, 2017", 11 pgs.
"U.S. Appl. No. 14/074,069, Response filed May 4, 2020 to Final Office Action mailed Feb. 4, 2020", 20 pgs.
"U.S. Appl. No. 14/074,069, Response filed Jun. 2, 2016 to Non Final Office Action mailed Mar. 2, 2016", 14 pgs.
"U.S. Appl. No. 14/074,069, Response filed Aug. 21, 2018 to Final Office Action mailed May 21, 2018", 13 pgs.
"U.S. Appl. No. 14/074,069, Response filed Oct. 7, 2016 to Non Final Office Action mailed Jul. 12, 2016", 8 pgs.
"U.S. Appl. No. 14/074,069, Response filed Nov. 9, 2020 to Non Final Office Action mailed Jul. 10, 2020", 20 pgs.
"U.S. Appl. No. 14/074,069, Response filed Nov. 27, 2019 to Non Final Office Action mailed Aug. 30, 2019", 16 pgs.
"U.S. Appl. No. 14/705,329, Non Final Office Action mailed Oct. 5, 2017", 8 pgs.
"U.S. Appl. No. 14/705,329, Notice of Allowance mailed May 3, 2018", 7 pgs.
"Chinese Application Serial No. 201380057820.8, Office Action mailed Dec. 13, 2016", 26 pgs.
"European Application Serial No. 13795104.2, Extended European Search Report mailed Nov. 9, 2015", 8 pgs.
"International Application Serial No. PCT/US2013/068886, International Preliminary Report on Patentability mailed May 21, 2015", 8 pgs.
"International Application Serial No. PCT/US2013/068886, International Search Report mailed May 13, 2014", 4 pgs.
"International Application Serial No. PCT/US2013/068886, Written Opinion mailed May 13, 2014", 6 pgs.
"International Application Serial No. PCT/US2015/029425, International Search Report mailed Jul. 15, 2015", 4 pgs.
"International Application Serial No. PCT/US2015/029425, Written Opinion mailed Jul. 15, 2015", 6 pgs.
"ProModel Project Review", [Online] Retrieved from the internet: <www.promodel.com>, (Apr. 8, 2006), 2 pgs.
"U.S. Appl. No. 61/556,667, filed Nov. 7, 2011".
Drira, et al., "Facility layout problems: A survey", Annual Reviews in Control, Pergamon, Amsterdam, NL vol. 31, No. 2, (Nov. 5, 2007), 255-267.
Guirardello, R, et al., "Optimization of process plant layout with pipe routing", Computers & Chemical Engineering, Pergamon Press, Oxford, GB, vol. 30, No. 1, (Nov. 15, 2005), 99-114.
U.S. Appl. No. 14/074,069, filed Nov. 7, 2013, Automated Sample Processing System.

* cited by examiner

AUTOMATED SAMPLE PROCESSING SYSTEM

CROSS-REFERENCES TO RELATED APPLICATIONS

This application is a continuation of U.S. patent application Ser. No. 14/074,069, filed Nov. 7, 2013, which application claims the benefit of priority to U.S. Provisional Patent Application No. 61/723,736, filed Nov. 7, 2012 and entitled "Automated Sample Processing System." These applications are herein incorporated by reference in their entirety for all purposes.

BACKGROUND

Software configurations for laboratory systems are known.

One disclosed analysis system is described in EP 2 450 711 A1. The disclosed system comprises a sample workflow manager and an instrument manager interacting with each other to optimize the sample handling workflow in the analysis system, as can be seen in FIG. 2 of EP 2 450 711A1.

The instrument manager receives test orders either from a user or an LIS (laboratory information system) and sends commands to connected analyzers or other connected automated devices like a transport unit. The sample workflow manager receives process information from a connected analyzer unit and sends preconfigured processing routes to the instrument manager to process information.

Another disclosed analysis system is described in U.S. Pat. No. 6,581,012. The disclosed software architecture for a clinical laboratory system described in this patent comprises three layers for handling the workflow from test requests to test results, schematically depicted in FIG. 2 of U.S. Pat. No. 6,581,012. Another reference that describes sample scheduling is U.S. Pat. No. 6,721,615.

At a user interface layer, the user enters test orders which are forwarded to a workflow automation layer. The workflow automation layer generates test instructions from the test orders and forwards them to a physical element layer to conduct the requested test by means of a connected analyzer. The analyzer returns the test result via a correspondent SPM (specimen processing module) object and within the workflow automation layer the result is verified and, if valid, forwarded to the user interface layer for optical representation to the user.

While such systems can be useful, there is a continuing need for systems that can provide for better sample processing optimization. For example, process plans created by instrument managers for sample containers can have many different potential routes. The route taken by a sample container may not be optimal, thereby reducing the overall efficiency of a laboratory system. Improving the overall efficiency is desirable, because there are often more samples to process than processing capacity on a laboratory system.

Embodiments of the invention address these and other problems.

BRIEF SUMMARY

Embodiments of the invention are directed to improved sample processing systems in the diagnostic laboratory environment, and particularly in the automated diagnostic laboratory environment having multiple diagnostic analyzers connected by a sample transport system. In general, the diagnostic laboratory environment includes multiple analyzers which perform discrete diagnostic tests on patient samples and a system which prepares such patient samples for such tests. An automated diagnostic laboratory includes both the sample preparation system, the multiple analyzers and a system for transporting the patient samples between the sample preparation system and the individual analyzers. The present invention is directed to the process control architecture which controls the operation of the sample preparation system and how such system selects, prepares and transfers the patient samples to the analyzers.

In embodiments of the invention, a workflow management layer (WML) can generate a process plan for a sample. The process plan can include information regarding the processes that need to be run on the sample (e.g., an immunoassay test, a chemistry test, etc.), information regarding status of the analyzers on the system (e.g., availability, reagent status, etc.) and specific steps for the preparation of the sample needed to be made in preparation for the downstream processing on the analyzers. The process plan may be provided to a process control layer (PCL), which may operate independently of the WML. The PCL, working with at least one processor, can review all of the samples that are waiting to be processed, and can evaluate them. The order in which the samples are picked up can depend on the tests to be performed on the samples and the types and status of the analyzers (or other processing devices such as analyzers) that will be used to process the samples (e.g., if there is any back up of samples at the analyzers or other processing devices that will slow down the entire process).

The WML may be a single layer, or in one embodiment two separate layers. In this embodiment the first layer receives instructions on the types of tests to be performed on each sample in order to develop a basic analyzer list to route such sample. The second layer communicates with both the first layer of the WML to obtain the route and the individual analyzers in order to ascertain whether such analyzers can perform the required tests, possess sufficient supplies and reagents for such test and are otherwise operational. This information, along with the route is transmitted to the PCL. The PCL utilizes such information to select the appropriate patient sample for processing dependent upon various rules to maximize the flow of the patient sample through the laboratory.

In some embodiments, the sample that is processed first will depend on these certain rules. For example, one rule may be that only STAT (sample tubes with a short turnaround time or high processing priority) samples are picked up first, but only if it can be processed faster than any other non-STAT sample The input buffer preceding each analyzer in the system can be analyzed by the PCL to determine if it is full to the point that adding more samples to the input buffer will slow the system down. For example, two samples including a STAT sample and a non-STAT sample may need to be processed by the laboratory automation system. The STAT sample may need to go through immunoassay analyzer A, and the PCL may determine that there is a queue of other samples waiting to be processed by the immunoassay analyzer A. The non-STAT sample, on the other hand, does not need to be processed by immunoassay analyzer A, but is to be processed by immunoassay analyzer B and chemistry analyzer A, which do not have queues of samples waiting to be processed. Under this scenario, the non-STAT sample may be selected for processing before the STAT sample is selected for processing in order to maximize the processing speed and utilization of the laboratory automation system in view of the constraints of the system as a whole. Additionally, the number and type of steps required by the sample preparation system to prepare each sample for process by the downstream analyzers may also be taken into account in the selection of the sample in order to maximize the flow through the entire laboratory system.

In embodiments of the invention, there can be constant communication between the WML, and the laboratory automation system including the PCL and the connected and non-connected analyzers, as well as the controllable lab equipment contained in the sample preparation system such as the including centrifuges, pipettors, etc. The WM L can continually receive updates as to the status of connected and non-connected analyzers (e.g., the analyzers are operational, not-operational, busy, free, etc.), or other controllable lab equipment, and can continually provide process plans and analyzer status information to the PCL. Using this information, the PCL can operate independently to generate a schedule for patient samples dependent upon the route for such sample, which can optimize the processing of the sample through the laboratory automation system and other controllable lab equipment.

In embodiments of the invention, the time for processing a sample from the time when processing starts, to the time after the sample is analyzed by an analyzer can be characterized as two sections of time. The first section of time (time period A) may be the speed of processing the sample through the sample preparation system of the laboratory automation system where the sample is prepared for analysis. The second section of time (time period B) may be the remaining time needed to process the prepared sample to determine a test result at the required analyzers. Embodiments of the invention can be used to effectively minimize the total of the first section of time (time period A) and the second section of time (time period B).

One embodiment of the invention is directed to a method comprising generating, by at least one processor using a workflow management layer, a process or route plan for a sample in a sample container (e.g., a sample tube), and providing the route plan to the process control layer (PCL). The route plan comprises a list of processing instructions that may be in a given order. The method also comprises determining, by the at least one processor using the process control layer, an optimized route through the sample preparation system and to each of the required analyzers, according to the route plan and according to the availability of the sample preparation system and the priority of the sample, using the process control layer (PCL), and processing the sample using the optimized route.

Another embodiment of the invention is directed to a computer apparatus comprising at least one processor, and a memory device storing a plurality of software components, executable by the at least one processor. The plurality of software components comprise a workflow management layer operable to generate a process plan comprising a list of processing steps in a given order, and a processor control layer operable to determine an optimized route.

Another embodiment of the invention is directed to a system comprising a plurality of sample processing subsystems, and a computer apparatus. The computer apparatus comprises at least one processor, and a memory device storing a plurality of software components, executable by the at least one processor. The plurality of software components comprise a workflow management layer operable to generate a process plan, and a processor control layer operable to select an optimized route.

Another embodiment of the invention is directed to an automated sample processing system comprising a workflow management controller comprising a first processor, and a first computer readable medium comprising a workflow management layer. The system also comprises an LAS controller coupled to the workflow management controller and being part of a laboratory automation system, the LAS controller comprising a second processor, and a second computer readable medium comprising a process control layer and a middle control layer.

Another embodiment of the invention is directed to a method comprising providing, by a workflow management controller comprising a first processor, and a first computer readable medium comprising a workflow management layer, instruction data for a sample to be processed to an LAS controller coupled to the workflow management controller, the LAS controller and being part of a laboratory automation system, and comprising a second processor, and a second computer readable medium comprising a process control layer and a middle control layer. The method may also comprise executing, by the LAS controller, the instruction data.

Another embodiment of the invention is directed to a method comprising providing, by at least one processor using a process control layer, a route leg to a middle control layer. The method also comprises generating, by the at least one processor and the middle control layer, instructions to control the operation of a subsystem of the route leg or a subassembly container of the route leg, wherein the subassembly container controls multiple subassemblies associated with the subassembly container. The method also comprises executing the instructions by a device control layer. In some embodiments, the middle control layer (MCL) may further receive route legs from the PCL to process, and these route legs may be further optimized by the MCL. The MCL may operate independently of the PCL and the WML in embodiments of the invention.

Another embodiment of the invention is directed to a system comprising a computer apparatus comprising at least one processor, and a memory device storing a plurality of software components, executable by the at least one processor, the plurality of software components. The software components comprise a process control layer configured to provide using the at least one processor a route leg to a middle control layer, a middle control layer configured to generate using the at least one processor, instructions to control the operation of a subsystem of the route leg or a subassembly container of the route leg. The subassembly container controls multiple subassemblies associated with the subassembly container. The system also comprises a device control layer configured to execute the instructions using the at least one processor.

In yet another embodiment the WML is formed by two separate control layers. These layers may be executed using a single processor, or two or more different processors. The first layer receives instructions as to the types of tests to be performed on the patient samples. This first layer then develops a route plan for such sample defining the type of analyzer required to perform such tests. The route plan only identifies the type of analyzer, not the specific analyzer which will perform such tests. The second control layer provides for continuous communication with the sample preparation system and the individual analyzers. This second control layer queries the preparation system and the analyzers to determine the status of each of these units. This status includes the availability of each system or analyzer, the amount of necessary reagents and supplies at each system or analyzer, and the maintenance and/or quality type status of each system or analyzer. This second layer provides the information as to the status of the preparation system and analyzers, along with the sample route information to the PCL, which then utilizes such information to develop the schedule for the individual samples through the laboratory system. In accordance with this embodiment, the first layer of the WML may be encompassed by what is referred to as the middleware, with the second layer being an additional processing layer not presently employed in laboratory automation systems.

These and other embodiments of the invention are described in further detail below.

DETAILED DESCRIPTION

Figure 1A:
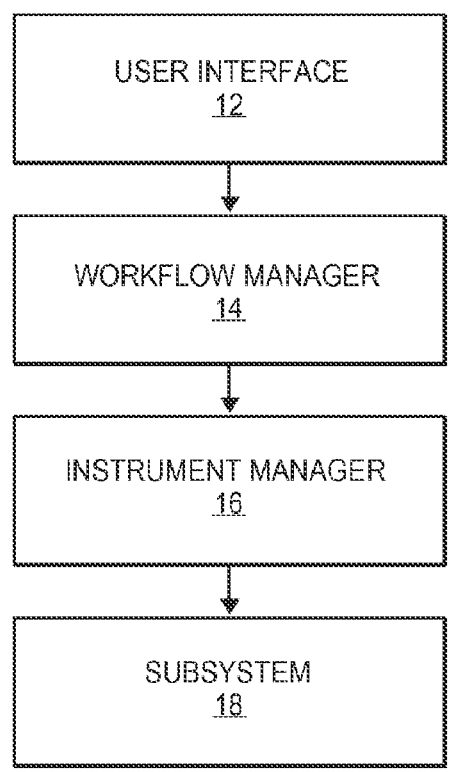
FIG. 1A is a block diagram of a high level management architecture according to an embodiment of the invention.

Embodiments of the invention are directed to an improved sample workflow management architecture for managing the workflow of patient samples in a clinical laboratory. Prior to discussing embodiments of the invention, it may be helpful to discuss some terms.

As used herein, "instruction data" can include information on how a sample container and/or a sample in the sample container can be processed. In some embodiments, instruction data may include higher level instructions that are provided to a laboratory information system by a user or an apparatus. In other embodiments, instruction data may refer to instructions for processing a sample or sample container where the instructions are passed from one software module to another.

A "transport system" may comprise any suitable hardware that can be used to transport a sample container. Exemplary transport systems may comprise one or more of pucks, tracks, belts, grippers, etc.

"Sample container data" may refer to data which characterizes a sample container and/or a sample within the container. Sample container data may include, for example, the color of a cap on a tube, the size or shape of a tube, an identifier on the tube (e.g., a barcode on a label on a tube), etc. The sample container data may include data which identifies the sample (e.g., blood, urine, etc. from a particular person) and/or how the sample is to be processed (e.g., normal processing, short turn around, etc.). In some embodiments, the weight of a sample container and/or a liquid level of a sample in a sample container may be determined by a robotic gripper while the sample container is being transported. Further details regarding this can be found in U.S. Provisional Patent Application No. 61/556,667, filed Nov. 7, 2011, U.S. Provisional Patent Application No. 61/616,994, filed Mar. 28, 2012, and U.S. Provisional Patent Application No. 61/680,066, filed Aug. 6, 2012, as well as PCT/US2012/063931, filed on Nov. 7, 2012, which are herein incorporated by reference in their entirety for all purposes "Device commands" may comprise instructions that are executed by a device control layer that control a particular subsystem or subassemblies in the subsystem. Such device commands may relate to a state (e.g., on or off), the speed of operation, etc.

A "region" in the context of a group of sample containers, may include a group of containers that are to be similarly processed (e.g., all to be centrifuged) and/or have similar characteristics (e.g., all blood samples).

A "subsystem" may include an instrument or collection of instruments that can perform a specified function. Examples of subsystems include a recapper, capper, centrifuge, and aliquoter.

A "subassembly" may be part of a subsystem. Each subsystem may comprise one or more subassemblies. For example, an "output" subsystem may comprise a gripper and a number of drawers. The gripper may be considered a subassembly in this example.

A "subassembly container" may include a software module that controls a designated grouping of two or more subassemblies. The two or more subassemblies may be parts of different subsystems.

A "memory device" may be any suitable device that can store electronic data. A suitable memory device may comprise a computer readable medium that stores instructions that can be executed by a processor to implement a desired method. Examples of memory devices may comprise one or more memory chips, disk drives, etc. Such memory devices may operate using any suitable electrical, optical, and/or magnetic mode of operation.

A "processor" may refer to any suitable data computation device or devices. A processor may comprise one or more microprocessors working together to accomplish a desired function.

A "process plan" can include information regarding a process that needs to be run on a sample. It may include information about the present number of analyzers available to perform a desired test and their status, and it may also include a list of processing steps and/or subsystems that can be used to process the sample For example, the process plan may include information regarding the specific subsystems in the sample preparation system to which the sample will be directed, such as the aliquoters, centrifuges, etc. In some embodiments, the process plan does not specify the exact subsystems that may be used to process the sample. For example, if a laboratory automation system comprises three centrifuges A, B, and C, the process plan may simply indicate that one of the steps that is used to process the sample is centrifugation, and may not specify which particular centrifuge to use. In another example, if a laboratory automation system comprises three centrifuges A, B, and C, the process plan may simply indicate that the sample may be processed by only centrifuge A or B, because centrifuge C may be down or temporarily occupied or otherwise unavailable. The process control layer may then use that test plan and decide which of centrifuges A and B is the best choice to process the sample in order to maximize the speed of the sample through the analytical process.

A "route" can refer to a path that a sample may take through a laboratory automation system. The path may include processing through a specific set of subsystems in a specific order, at specific times. For example, if a laboratory automation system comprises centrifuges A and B, decappers A and B, and aliquotters A and B, then an example of a route may be to process the sample through centrifuge A, decapper B, and then aliquotter B.

A "leg" may include a portion of a route. A leg can include a single subsystem type or a path between two or more subsystems types, but not all subsystem types required for a route. For example, if a route comprises centrifuge A, decapper B, and aliquotter B, then a leg of the route may include decapper B and aliquotter B. In another example, the route leg may simply comprise aliquotter B.

In embodiments of the invention, a management architecture interfaces with a laboratory information system (LIS) and acts as mediator between the LIS and a clinical laboratory. The LIS or a user provides the management architecture with test orders used for processing the samples. Based on these test orders, the management architecture generates workflow or tube instructions (also referred to as process plans) for either the lab personnel or a laboratory automation system (LAS). The management architecture also provides test orders to any connected (or "automated") or non-connected (or "stand-alone") analyzers in a laboratory upon query. Exemplary LASs are described in U.S. provisional patent application Nos. 61/556,667, filed on Nov. 7, 2011, and 61/616,994, filed on Mar. 28, 2012, which are herein incorporated by reference in its entirety for all purposes.

When the LAS or a single analyzer processes a sample, sample related results are handled within the management architecture. With regard to the LAS, the results comprise tube data including sample state updates corresponding to the peri-analytical processing performed on the sample. As used here, "peri-analytical" can refer to processing, which may include "pre-analytical" processing and "post-analytical" processing. With regard to a single analyzer, the results can comprise test results. Upon receipt of these test results, the management architecture can perform additional analyses on the test results and, if required, update the workflow for a sample. After validating the test results, the management architecture forwards the test results to the LIS or the user.

FIG. 1A is a block diagram of a high level management architecture according to an embodiment of the invention. FIG. 1A shows a user interface portion 12, that interfaces with a workflow manager portion 14. The user interface portion 12 can be a portion that interacts with a user, such as a laboratory technician. It can be part of a laboratory information system (LIS). The workflow manager portion 14 may manage the workflow for various LASs. It may include a workflow management layer, which is described in further detail below.

The workflow manager portion 14 interfaces with an instrument manager 16, which interfaces with a subsystem portion 18. The instrument manager portion 16 can include a process control layer, which is described in further detail below. The subsystem portion 18 may comprise one or more subsystems (e.g., a centrifuge, a decapper, etc.). The instrument manager portion 16 may also comprise a middle control layer and a device control layer.

In embodiments of the invention, the workflow management portion 14 can generate a variable/flexible process plan while the instrument manager portion 16 schedules the process according to the variable/flexible process plan. Embodiments of the invention allow for the generation of a flexible or variable process plan comprising multiple possible routes. The scheduling of the process can be decoupled from the generation of the variable/flexible process plan.

Figure 1B:
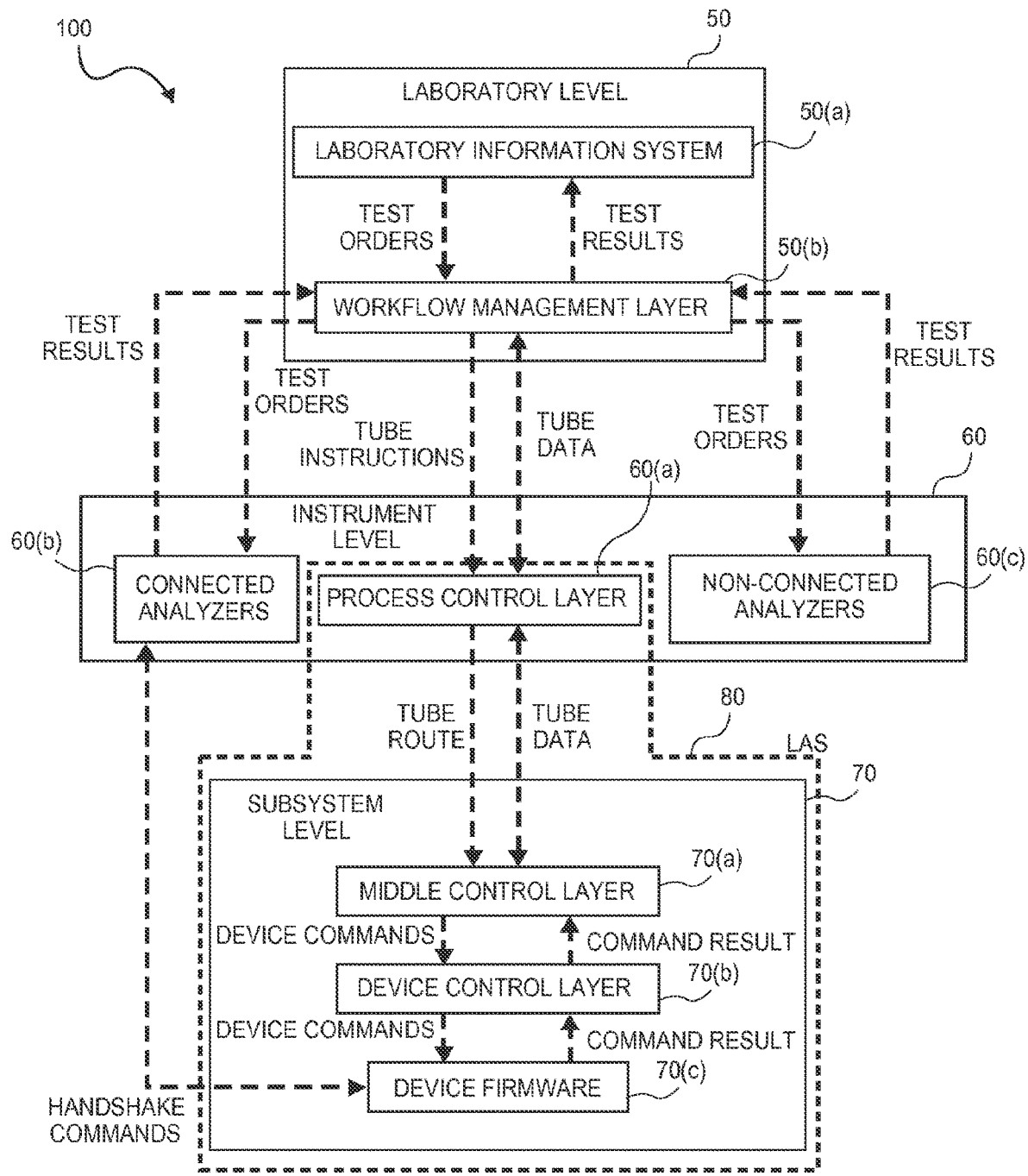
FIG. 1B is a block diagram of a management architecture according to an embodiment of the invention.

FIG. 1B shows a block diagram of management architecture 100 according to an embodiment of the invention. The management architecture 100 can manage data of at least three hierarchical levels, the laboratory level 50, the instrument level 60 and the subsystem level 70, with each level responsible for its own specific set of data. These layers can be in the form of software components that are stored on a memory and/or computer readable medium and that work with one or more processors (e.g., data processors) residing on one or more computer apparatuses. For example, all three layers 50, 60, 70 could reside on a computer readable medium on one computational apparatus with one or more processors (e.g., microprocessors). Alternatively, the three layers 50, 60, 70 could reside on three computer readable media residing on three operationally computational apparatuses, each with one or more processors (e.g., microprocessors). In some embodiments, the workflow management layer 50(b) resides in a first computational apparatus (e.g., a first server computer), while the process control layer 60(a) and the middle control layer 70(a) reside in a second computational apparatus (e.g., a second server computer). The first and second computational apparatuses can communicate with each other, but can run independently of each other. The second computational apparatus can be part of an LAS 80.

At the laboratory level 50, the management architecture 100 can be responsible for managing configuration data across an entire laboratory. In a laboratory setting, the management architecture 100 typically manages the information needed by one or more LASs, and multiple connected and non-connected analyzers 60(b), 60(c).

In embodiments of the invention, the LAS 80 can include the process control layer 60(a), the middle control layer 70(a), the device control layer 70(b), and the device firmware 70(c). Embodiments of the invention can also include many LASs, and one or multiple connected and unconnected analyzers 60(b), 60(c), while using a single workflow management layer 50(b).

Laboratory level 50 data items that are common across multiple automation lines may be configured at this level. Specifically, configuration data may comprise at least the LAS input area information, sample container (tube) type information, and workflow management information.

LAS input area information includes information regarding the configuration of the racks and rack holder plates for drawers within the LAS input area and the mappings of instructions to different racks or rack regions. These can be defined as lab level data items, since the same LAS input area configuration can be used on different LASs.

Sample container (tube) type information includes configuration of the tube types, cap types, and cap colors that will be used in the laboratory. The LAS can be trained on these tube types before processing them.

Workflow management information (e.g., instruction data) contains sample processing rules, which the management architecture 100 can use to generate process plans for sample tubes. In large clinical laboratories with multiple LASs, sample processing rules may vary from one LAS to the next. In this case, the management architecture 100 can be capable of generating the appropriate process plans for each of the LASs.

Configuration data that are generated at the lab level can be stored in a management architecture database. The management architecture database may be present in the workflow management layer 50(b), or in any other suitable location. As a result, the data can be available throughout the entire laboratory.

The management architecture 100 may also comprise a graphical rules engine (not shown), which may be referred to as the rule editor of the management architecture 100. The graphical rules engine may be present in the workflow management layer 50(*b*), or in any other suitable location. The rules editor provides the user with the ability to define a set of rules to manage the laboratory workflow. The rules can be separated into two main categories: rules for validating test results; and rules for processing samples.

Rules for validating test results specify how test results can be auto-validated by the management architecture 100. As part of the auto-validating results, rules can be provided so that additional processing such as re-running a sample, adding on sample processing steps, or diluting a sample can be performed if needed to obtain acceptable results. If the results are still inconclusive, a rule can be provided such that the lab operator can hold the sample for inspection.

Work instructions for processing samples specify the peri-analytical processing that may be needed for the samples based on the test orders received from the LIS 50(*a*). Peri-analytical processing of a sample includes, but is not limited to centrifuging, level sensing, decapping, aliquotting, and recapping. Peri-analytical processing also comprises sending sample tubes to connected analyzers, output trays, and archives or storage facilities.

At the instrument level 60, the management architecture 100 manages instrument specific information including a virtual representation of the LAS hardware configuration (also referred to as a "site network"), the workflow instructions, and/or process plans, and subassemblies of specific work instructions (also referred to as route legs). Further, the management architecture 100 collects and manages statistical data, log files and various subsystem configurations.

The site network can be a graph consisting of site nodes (buffer, processing, and transport) and the edges connecting the nodes. The site network can represent the physical layout of the LAS and can be used to virtually abstract the various hardware configurations.

At the subsystem level 70, the management architecture 100 manages data resulting from the teaching of the individual subsystems and subassemblies within the LAS. Each subsystem and the corresponding subassemblies within it may have numerous robotic alignment points, threshold values, and other device specific data that need to be configured. For example, at installation time, before samples are placed on the system to be processed, individual automation subsystems such as input stations, centrifuges, decappers, etc. can be taught (e.g., teaching the subsystems their position in the overall system) or aligned before use. The data generated during the teaching phase can be stored in configuration data files. The configuration data files can be maintained at the subsystem level 70 since the data apply only to the specific subsystems. The management architecture 100 need not care for or even be aware of the subsystem level 70 specific data. For backup/restore purposes, the data files could be zipped up and sent to an appropriate database in the management architecture 100 for storage. When restoring, the subsystem level 70 could ask the management architecture 100 to download the backup zipped file before doing the restore.

As is apparent from the discussion above, within the architectural levels of the management architecture 100, the software can be further organized with layers of software components. Layered software allows the functionality to be further decomposed into finer granularity. A hierarchy can be implied in a layered structure. These layers can be in the form of software components that are stored on a memory and/or computer readable medium and that work with one or more processors (e.g., data processors) residing on one or more computer apparatuses.

In some embodiments of the invention, the management architecture 100 comprises four control layers, with each level responsible for controlling specific processes in a clinical laboratory. They include a workflow management layer (WML) 50(*b*), a process control layer (PCL) 60(*a*), a middle control layer (MCL) 70(*a*), and a device control layer 70(*b*).

The WML 50(*b*) can be the top level or view to the user, utilizing the sample processing rules specified in its rules engine to determine the process plan that will be run on the sample. For laboratories with multiple LAS lines, the WML 50(*b*) can allow each line to be configured with a different workflow management scheme and can concurrently manage multiple active workflows. In addition, the WML 50(*b*) can handle key software features including the LIS interface 50(*a*), quality control (QC), result management, sample tracking, backup and restore, instrument status, test ordering, configuration, online help, user authentication, and instrument discovery (an initial search run in an initialization phase of the system, to identify connected subsystems). As shown, the LIS interface 50(*a*) may provide test orders to the WML 50(*b*) and may receive test results from the WML 50(*b*).

The WML 50(*b*) can store the laboratory level 50 information used by all LAS and connected devices to process samples (configuration data). Upon startup, the WML 50(*b*) can communicate the configuration data to the PCL 60(*a*) and notify the PCL 50(*a*) of any additional changes to the configuration data after startup.

During operation, the WML 50(*b*) generates the process plans for a single sample container and provides this process plan to the PCL 60(*a*). The WML 50(*b*) can include several different software components to enable its functionality.

As shown in FIG. 1B, the WML 50(*b*) may be in communication with connected analyzers 60(*b*) and non-connected analyzers 60(*c*). Test orders may be provided (e.g., transmitted) to the analyzers 60(*b*), 60(*c*), and test results and other analyzer status information may be provided back to the WML 50(*b*). The information regarding the status of the various analyzers 60(*b*), 60(*c*) may be provided from the WML 50(*b*) to the PCL 60(*a*), and this information may be utilized by the PCL 60(*a*) to generate an optimal route (e.g., one that takes the priority of the sample, the availability of the analyzers, and the status of the subassemblies and subcomponents in the system) to maximize the processing capacity and speed of the laboratory automation system 80.

Embodiments of the invention may use a workflow management controller and/or an LAS controller to accomplish the functions described herein. A workflow management controller can be a server computer that is designed to handle data and workflow management for all connected and non-connected analyzers in a laboratory. The workflow management controller maintains a model and uses a database to persist it. It may run the laboratory information system 50(*b*) and the workflow management layer 50(*b*).

An LAS controller (not shown) allows the instrument to run as a standalone computer in case the workflow management controller fails. Thus, it can be a separate server computer from the workflow management controller computer, and it can include the process control layer 60(*a*) and the middle control layer 70(*a*). A device manager can handle communication with external systems such as the LIS 50(*a*), legacy analyzers, and other systems. A review client (e.g., in the workflow management layer 50(*b*)) can present information to the user and allows the user to provide input to the model. The review client works with the model, but all changes to the model can be performed by asynchronous requests to the workflow management controller.

Embodiments of the invention may include an automated sample processing system comprising a workflow management controller comprising a first processor, and a first computer readable medium comprising a workflow management layer, and one or more LAS controllers coupled to the workflow management controller. Each of the LAS controllers comprises another processor, and another computer readable medium comprising a process control layer and a middle control layer.

Figure 1C:
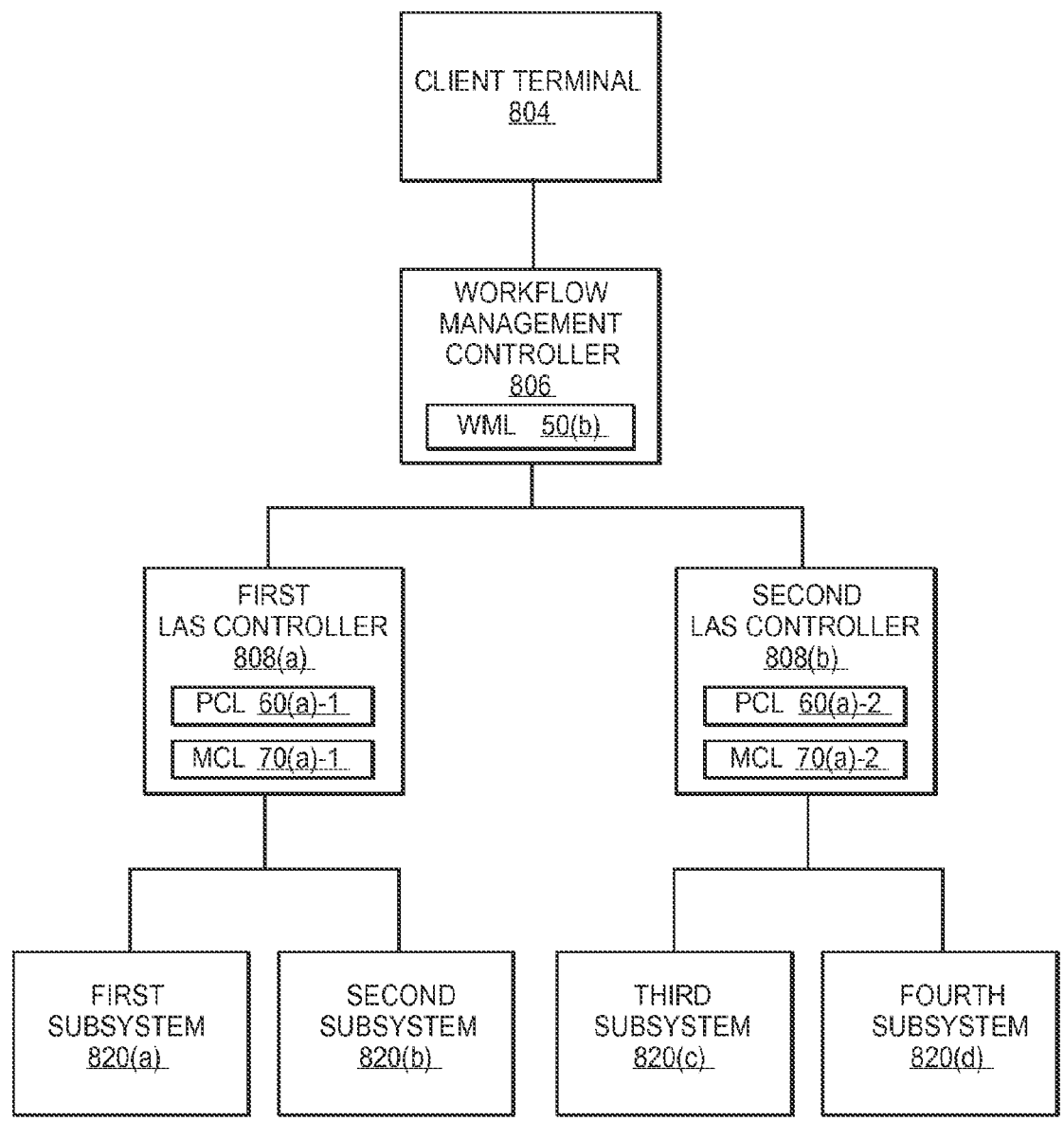
FIG. 1C shows block diagram illustrating some components of an automated sample processing system according to an embodiment of the invention.

FIG. 1C shows block diagram illustrating some hardware components of an automated sample processing system according to an embodiment of the invention. The system comprises a workflow management controller 806 operating a workflow management layer 50(*b*). The workflow management controller 806 may be coupled to a client terminal 804, which may be used by a user for inputting data into the system and obtaining data from the system.

The workflow management controller 806 may be coupled to a first LAS controller 808(*a*) operating a first process control layer 60(*a*)-1 and a first middle control layer 70(*a*)-1. The workflow management controller 806 may also be coupled to a second LAS controller 808(*b*) operating a second process control layer 60(*a*)-2 and a second middle control layer 70(*a*)-2. The first and second LAS controllers 808(*a*), 808(*b*) may comprise first and second processors, and first and second computer readable media (for storing the above-described software layers) associated with those processors.

The first LAS controller 808(*a*) may be in communication with a first plurality of subsystems comprising at least a first subsystem 820(*a*) and a second subsystem 820(*b*). The second LAS controller 808(*b*) may be in communication with a first plurality of subsystems comprising at least a third subsystem 820(*c*) and a fourth subsystem 820(*d*).

Although two LAS controllers are illustrated, embodiments of the invention may comprise more than two LAS controllers. Further, although two subsystems are shown for each LAS controller, more than two subsystems may be associated with each LAS controller.

As shown, the hardware configuration in FIG. 1B has a number of advantages. For example, if the workflow management controller 806 goes down, this will not affect the operation of the first and/or second LAS controllers 808(*a*), 808(*b*). The LAS controllers can still provide work instructions to the subsystems to process samples even if the workflow management controller 806 is down.

Referring again to FIG. 1B, the WML 50(*b*) of the management architecture 100 can be responsible for generating process plans for sample tubes based on a set of sample processing rules defined in its rules engine. The WML 50(*b*) submits this process plan for a particular sample tube to the PCL 60(*a*) upon receiving notification of a sample tube arrival by the PCL 60(*a*). In addition, regeneration of the existing process plans may be desirable if changes to either the tube states or the system states affect the original process plan. In some embodiments, the process plan can be depicted as a graph comprising nodes and routes, where each node contains an instruction informing the PCL of the processing desired for a sample. An instruction can represent an action performed on the sample at a subsystem. For example, the instruction "centrifuge" dictates that the sample be centrifuged at a centrifuge subsystem. The following list contains exemplary instructions supported by an LAS: centrifuge, decap, aspirate, label, dispense, recap, sort or store, etc.

Typically, a process plan contains a list of processes that need to be performed on a sample. If there are multiple subsystems that could perform one or more processes in the process plan, then there are multiple potential routes that a sample could take to fulfill the process plan. This can be graphically represented as a directed acyclical graph such as the one shown in FIG. 2A. Other types of representations may be used in other embodiments of the invention. As illustrated by the acyclical graph in FIG. 2A, a process plan according to an embodiment of the invention is flexible and variable, as different samples can be processed by different combinations of subsystems. The selected set of subsystems may be determined based on a number of factors.

Figure 2A:
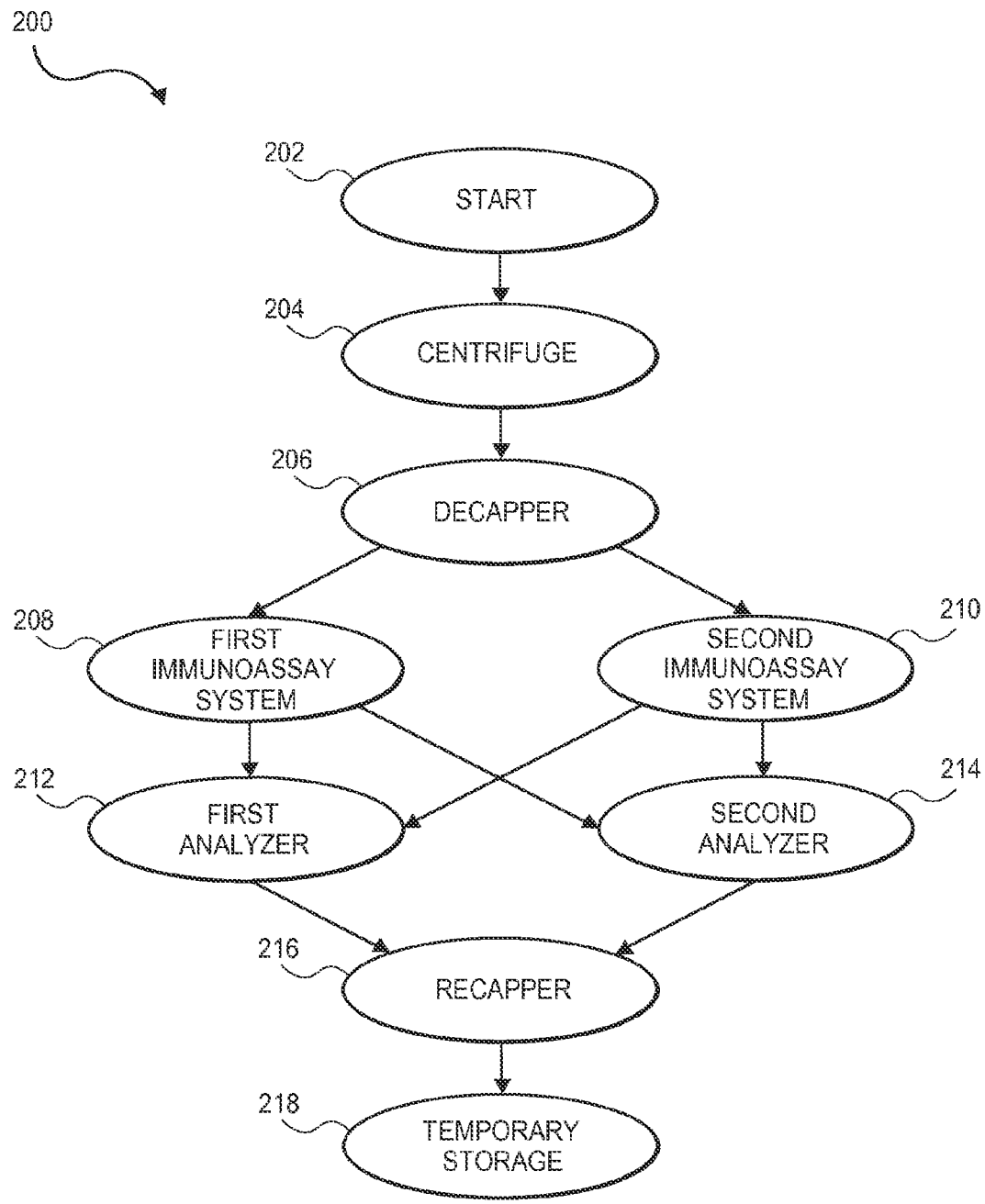
FIG. 2A shows a directed acyclical graph according to an embodiment of the invention.

As shown in FIG. 2A, a process plan 200 may having a starting point 202 for a sample tube, and the sample tube may then be centrifuged 204. After centrifuging, the tube may pass to a decapper 206. After the decapper 206, the process plan 200 may indicate that the sample tube could pass to either a first immunoassay system 208 or a second immunoassay system 210. Exemplary immunoassay systems may include DxI immunoassay systems from Beckman Coulter, Inc. An immunoassay system may comprise a sample preparation station, an aliquotting station, etc. After being processed by one of the first and second immunoassay systems 208, 210, the sample may then pass to one of a first analyzer 212 and a second analyzer 214. Exemplary analyzers may include the AU 680 series of analyzers from Beckman Coulter, Inc. After being processed by either the first analyzer 212 or the second analyzer 214, the sample tube can pass to a recapper 216 and then to a temporary storage unit 218. Of course, additional processing nodes may be present in process plans according to embodiments of the invention. In this particular example, there are four potential routes that a sample could take to be processed. The particular route chosen by the PCL 60(*a*) can be the one that results in the fastest processing through the laboratory automation system 80. In this regard, the PCL 60(*a*) within the laboratory automation system 80 may operate independently of the WML 50(*b*) as it determines the optimal route through the laboratory automation system 80.

Referring again to FIG. 1A with FIG. 2A, the PCL scheduler 60(*a*) can be responsible for analyzing the process plan and then selecting the most optimal route for the sample in order to satisfy either Turn-Around-Time (TAT) or throughput requirements. As the sample tube stops at each subsystem in the process plan for processing, new sample tube information can be generated. For example, after processing at the centrifuge 204, the MCL 70(*a*) can update the spin state in the sample tube information and forward the updated information to the PCL 60(*a*), while the PCL 60(*a*) will forward the tube information to the WML 50(*b*) for persistence. Using this feedback (e.g., the tube information), the WML 50(*b*) may continually update and optimize process plans, while the PCL 60(*c*) may continually update and its decisions on what might be an optimal route plan for sample. Unlike conventional systems (which can operate in a static manner), the system architecture according to embodiments of the invention operates dynamically in a manner that maximizes the speed of processing and utilization of the laboratory automation system.

As shown in FIG. 1B, the WML 50(*b*) may provide tube instructions including a process plan to the PCL 60(*a*) and may receive test results from the PCL 60(*a*). The PCL 60(*a*) may further provide tube route information to and receive tube data from the MCL 70(*a*).

The MCL 70(*a*) can notify the PCL 60(*a*) of changes in subsystem status (i.e., online, offline, available, unavailable), which uses this information to inform the WML 50(*b*) of the availability of the instructions associated with the affected subsystems. For a singular subsystem on the LAS, if the subsystem becomes unavailable, the PCL 60(*a*) can inform the WM L 50(*b*) that the instruction associated with that subsystem is also unavailable. If more than one of the same subsystems on the LAS is available, the loss of one subsystem may not affect the instruction availability due to the availability of the second subsystem. Based on the instruction availability, the WML 50(*b*) will have the appropriate information to create or modify process plans.

Overall, the WML 50(*b*) can persist throughout the entire life span of the other control layers below it. Sample workflow management, process plans, tube information, etc. can be sent and received between the WML 50(*b*) and the PCL (60(*a*) (which will in turn relay relevant data to the MCL 70(*a*), and so on, where appropriate). The WML 50(*b*) can generate a process plan that instructs the PCL 60(*a*) to produce a schedule, route and route leg which it uses to instruct the MCL 70(*a*). The MCL 70(*a*) then commands the DCL 70(*b*) to move the appropriate hardware components to carry out the routing of the tube(s).

In some embodiments, the MCL 70(*a*) can further optimize a route leg that it receives. For example, a route leg may include a subsystem may further comprise a number of subassemblies and the operation or selection of these subassemblies may be optimized by the MCL 70(*a*). Illustratively, a route leg may comprise the instruction "centrifuge." The centrifuge may comprise subassemblies including a centrifuge, centrifuge robot, an adapter gripper, and a shuttle. The MCL 70(*a*) may further select a specific centrifuge robot, shuttle or adapter gripper so that the fastest possible processing is achieved. The MCL 70(*a*) could also provide specific instructions to the DCL 70(*b*) (which may provide instructions to specific device firmware 70(*c*)) to control the operation of the specific subassemblies.

Throughout this chain of processing, as one layer hands off the processing to the layer below, it can proceed to process other actions, concurrently with the processing that is occurring in lower layers.

The PCL 60(*a*) scheduler uses the site network and the process plans to determine the most optimal route, and then schedules it accordingly to satisfy system objectives such as minimizing TATs while maximizing sample throughput when generating a route schedule. In some cases, where multiple processing sites are available to satisfy a WML instruction, the PCL 60(*a*) can perform load balancing in order to optimize the utilization of these sites.

Further, the PCL 60(*a*) can be responsible for breaking down the high-level process plans submitted from the WML 50(*b*) and generating more detailed route legs for a device controlled by the MCL 70(*a*). To do so, the PCL 60(*a*) incorporates the state of these processing sites (e.g., transport time, wait queue, waste disposal level, consumable level, etc.) in deriving one or more route legs to the MCL 70(*a*). The PCL 60(*a*) builds the route legs by augmenting the WML 50(*b*) process plans with site nodes from the site network graph, for instance, representing processing sites with transportation and buffer sites. The final route leg includes a list of site nodes that the sample tube needs to traverse, where each site node represents an action to be performed on the sample tube.

The middle control layer (MCL) 70(*a*) controls the status of the LAS subsystems and subassemblies within a subsystem. A hardware subassembly can be reused to build subsystems that are more complex. For example, the subsystem called "output" can comprise subassemblies like tube gantry robots and drawers.

In some embodiments, the MCL 70(*a*) can use the concept of "subassembly containers" to group subassemblies that share common resources. Some embodiments of the invention are directed to a method including providing, by a middle control layer, instructions to a subassembly container. The subassembly container controls multiple subassemblies associated with the subassembly container. The method also comprises executing by the subassembly container, the instructions. The multiple subassemblies comprise parts of two or more different subsystems.

Illustratively, two subassemblies sharing a common robotic arm may be placed into a container so that the container could coordinate the robotic arm movement between the two subassemblies. Since a container is in a sense a "wrapper" around a group of subassemblies, physical communication is with a container even though messaging is destined for a particular subsystem. The subassembly container hosts all used subassembly controllers, and is autonomous in a sense, that it can fulfill PCL 60(*a*) requests. That means that a subassembly container can move a tube from one site node to another site node and it can execute process steps according to the instructions requested in the route leg. A subassembly container can provide additional services to coordinate the hosted subassembly controllers, like collision avoidance for any hardware motion or initialization of all subassemblies to ensure a consistent and error-free state of the subsystem.

In some embodiments, particularly for subassembly containers with complex structures (multiple subassemblies wrapped in such a container, the route leg provided by the PCL 60(*a*) to the MCL 70(*a*) is not scheduled in all details by the PCL 60(*a*). The MCL 70(*a*) has additionally schedule capabilities to optimize the route legs for a subassembly container. It has partial knowledge of the site network, relevant for the subassembly container, and optimizes the route leg in a manner that is similar to what the PCL 60(*a*) does for the process plan. This hierarchical structure in the scheduler enables the system to schedule processing in a way that is faster and more precise then a system using a single scheduling instance which optimizing routes in a single step.

The MCL 70(*a*) receives route legs from the PCL 60(*a*) and maps the route legs to device commands which it sends to the DCL 70(*b*), and it processes the tube based on this route leg autonomously, without interaction with PCL 60(*a*). In particular, the route schedule is divided at the PCL 60(*a*) into several (overlapping) route legs to accommodate the various subassembly containers (thus a route leg can be a part of a route schedule). The route leg contains all necessary nodes for this subassembly container. The PCL sends a route leg to the appropriate subassembly container. The route leg can be available before the tube or another type of container physically arrives at the subassembly container to avoid communication time overhead.

The MCL 70(*a*) provides a sample status to the PCL 60(*a*) indicating, for instance, a tube's progress as it traverses the site network graph, or an error. A tube leaving a subassembly container can get out of scope of appropriate MCL 70(*a*) subsystems.

The management architecture 100 provides the flexibility of having one PCL 60(*a*) communicating with multiple MCLs 70(*a*). This one-to-many relationship can scale to match various hardware configurations in a laboratory. Tube information can be transferred to an MCL 70(*a*) when it is needed to process a tube and is transferred back to the PCL 60(*a*) when processing is complete or when any data regarding the tube has changed.

The status of the hardware subsystem including waste and supply status of tips, caps, etc., can be transferred to the PCL 60(*a*). Other subsystem statuses that can be included include the state of the subsystem; running, initializing, paused, or error. Further, processing control messages can be transferred to coordinate the subsystems to ensure TAT and system throughput utilization requirements.

The DCL 70(*b*) can be the hardware control layer which controls the hardware components in the LAS. The DCL 70(*b*) provides a communication interface to the MCL 70(*a*), wrapping proprietary protocols and different interfaces used by the different devices. It can be designed as modular system that can be extended by adding specific interface units and implement any protocol and workflow in an IEC 61131-3 compliant programming language.

The DCL 70(*b*) can receive low level commands from the MCL 70(*a*) and provides direct control of the hardware using proprietary protocols and different interfaces used by the different devices. The DCL 70(*b*) executes the commands, controls the hardware, and responds with command results (e.g., actuator positions, sensor data, etc.) to the MCL 70(*a*). The DCL 70(*b*) also provides commands and receives command results from the device firmware 70(*c*).

As shown in FIG. 1B, the device firmware 70(*c*) can communicate with connected analyzers 60(*b*), by exchanging handshake commands and other types of commands or messages.

In some embodiments, the LAS components can be controlled asynchronously with each other. They can be idle unless specifically commanded by the DCL 70(*b*). This can be as a result of a command sent from the upper levels. Synchronization with the hardware components can be addressed in the DCL 70(*b*) to prevent collisions (such as robot motions need to be synchronized where robot motions may overlap with each other), or other mechanical interferences. Otherwise, the hardware can all be controlled concurrently with each other, that is, one hardware component does not need to wait for any other before it can begin its action.

In one embodiment, the DCL 70(*b*) provides two generic DCL-Analyzer interfaces, one for Direct Transport Sampling (DTS) analyzers, and one for rack based analyzers (RBU). These generic interfaces protect the MCL 70(*a*), PCL 60(*a*) and WML 50(*b*) against analyzer hardware changes. The DTS subassembly container can take care of locking and releasing of a carrier. The generic DCL-DTS analyzer interface can handle the tube handshake with all possible DTS analyzers. After the DTS subassembly container locks the carrier, the DCL 70(*b*) can tell the analyzer to aspirate. Afterwards, the analyzer tells the DCL 70(*b*) that the aspiration process is completed. The DTS subassembly container can then release the carrier. The RBU subassembly container takes care of transporting tubes from the transport system to a rack, and vice versa. The RBU-analyzer interface can handle the rack handshake. The DCL 70(*b*) tells the analyzer when a rack is ready to feed in to the analyzer. The analyzer tells the DCL 70(*b*) when a rack is ready for transport from the analyzer to the RBU.

With the exception of the DCL 70(*b*) (not working with the abstract nodes of the site graph), all software levels (WML, PCL, MCL) can have a different view of the site network graph at different levels of granularity.

In embodiments of the invention, the WML (i.e., the route planner) may have a macroscopic view of the site graph. For example, in some cases, only "major" nodes/sites of the site graph are visible to the workflow manager layer. The WML knows the connections (edges) between these "major" nodes and knows in which directions samples can be transferred between these nodes. No information regarding the time is needed for such transfers.

In embodiments of the invention, the PCL (i.e., the scheduler) may have a more detailed view of the site network graph. It can view more nodes than the WML. For example, transport nodes may be visible to the PCL, but not the WML in some embodiments. The edges between these nodes, as well as the allowed directions may also be known to the PCL. The PCL also knows the time needed to move samples between these nodes.

In embodiments of the invention, the MCL can control activity of a subsystem (e.g. the decapper module or the centrifuge module). Only the respective subsystem nodes are visible to the MCL, but the MCL can have an even more detailed view of such subsystem nodes than the PCL. For example, an additionally visible node to the MCL that would not be visible to the PCL or the WML may be a diverter of a transport lane within the subsystem.

Exemplary Process Flow

Some embodiments of the invention are directed to methods. In one embodiment, a method includes receiving instruction data relating to a sample in a sample container, generating, by at least one processor using a workflow management layer, a process plan for the sample, providing the process plan to a process control layer. The process control layer and the at least one processor determines an optimized route using the process plan. The optimized route is provided to a middle control layer, wherein the at least one processor and middle control layer are operable to cause a transport system to transport the sample container along the selected route.

Figure 2B:
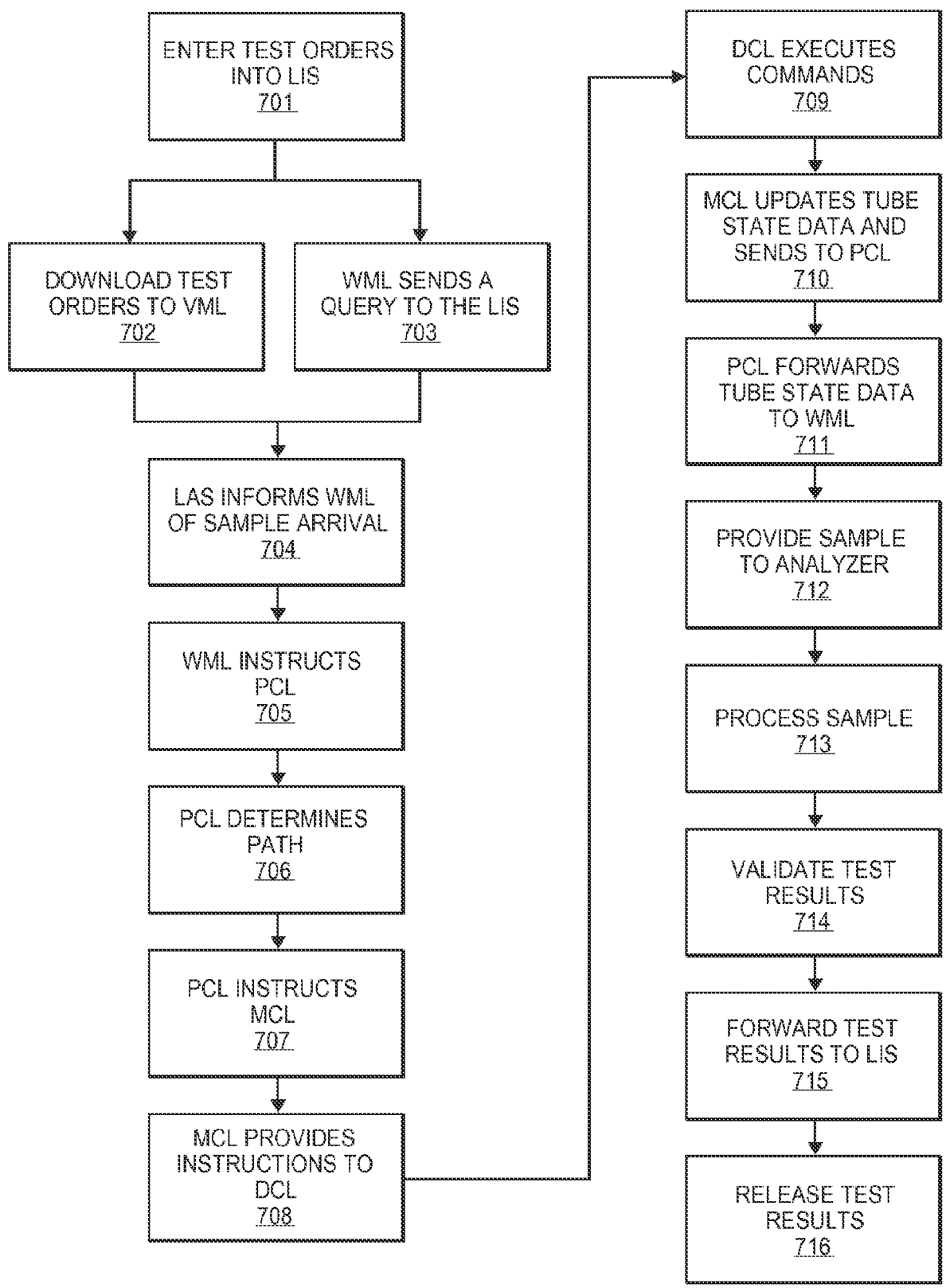
FIG. 2B shows a flow chart illustrating method according to an embodiment of the invention.

The sequence of data flow using the management architecture in FIG. 1(*a*) can be described with a clinical workflow. The steps in the workflow are shown in FIG. 2B. Embodiments of the invention are not limited to the processing steps described in FIG. 2B, and one or more steps may be omitted or added in embodiments of the invention.

In step 701, a medical or laboratory personnel enters test orders for samples at a laboratory information system 50(*a*) or at the workflow management layer 50(*b*). Test orders may indicate the type of sample (e.g., blood) and/or tube (e.g., test tube) to be processed, the type of analysis desired, and/or the priority of the sample (e.g., STAT or short turnaround time).

In step 702, the laboratory information system 50(*a*) downloads the test orders to the workflow management layer 50(*b*). In other embodiments of the invention, the workflow management layer 50(*b*) may send a query to the laboratory information system 50(*b*) for test orders (step 703).

In step 704, a rack with samples is loaded onto the laboratory automation system via an input drawer. The laboratory automation system informs the workflow management layer 50(*b*) of the arrival of a sample after retrieving the sample from the rack.

In step 705, the workflow management layer 50(*b*) instructs the process control layer 60(*a*) with the processing instructions required for the sample. For example, the workflow management layer 50(*b*) may generate and provide a process plan to the process control layer 60(*a*).

In step 706, the process control layer 60(*a*) determines which automation hardware subsystems (i.e., which route) can best satisfy the processing instructions in order to satisfy the sample's Turn-Around-Time while maximizing sample throughput. Information that the process control layer 60(*a*) can use to determine which automation subsystems can best satisfy the processing instructions may include the availability of the analyzers or other instruments, the availability of consumables at such instruments, the backup at the various instruments, etc.

In step 707, the process control layer 60(*a*) provides the middle control layer 70(*a*) with routing instructions for the sample.

In step 708, the middle control layer 70(*a*) maps the routing instructions to device commands and sends the commands to the device control layer 70(*b*).

In step 709, the device control layer 70(*b*) executes the commands, controls the hardware, and responds with command results (e.g., actuator positions, sensor data, etc.) to the middle control layer 70(*a*).

In step 710, the middle control layer 70(*a*) updates the sample's tube state data and forwards the data to the process control layer 60(*a*). This tube state data can be used by the process control layer 60(*a*) to optimize the routes in subsequent process plans received from the workflow management layer 50(*b*).

In step 711, the process control layer 60(*a*) forwards the tube state data to the workflow management layer 50(*b*).

After step 711, the sample container may be provided to an analyzer 60(*b*), 60(*c*), which may be connected or unconnected to the LAS 80.

In step 712, for connected analyzers 60(*b*), samples are routed directly to the analyzers. For standalone analyzers 60(*c*), samples are routed to trays. Laboratory personnel unload these trays and manually load samples to the appropriate analyzers.

In step 713, one or more analyzers 60(*b*), 60(*c*) process the sample. The analyzers 60(*b*), 60(*c*) send test results to the workflow management layer 50(*b*).

In step 714, the workflow management layer 50(*b*) validates the test results.

In step 715, once validated, the workflow management layer 50(*b*) forwards the test results to the laboratory information system 50(*a*) and a sample complete message to the process control layer 60(*a*) so the completed sample can be stored.

In step 716, the laboratory information system 50(*a*) releases the validated test results to medical or laboratory personnel.

Graphical User Interface (GUI)

The graphical user interface (GUI) for the management architecture 100 can use a common console for the LAS system. Most instruments can have an attached corresponding graphical display, called FRAME-GUIs, because they are physically attached to a hardware frame.

The GUI concept adapts to the levels concept explained in detail above. For each level (Laboratory Level 50, Instrument Level 60 and Subsystem Level 70), a certain functional range can be used to assure usability and safety, superior handling, flexibility and ability for integration. For safety issues, user rights define the access to configuration of interfaces. At the top level, the GUI can provide a laboratory overview with defined information to react to any change and to enable spontaneous actions. Other levels are configured according to their position in the lab-instrument-subsystem hierarchy.

Figure 3:
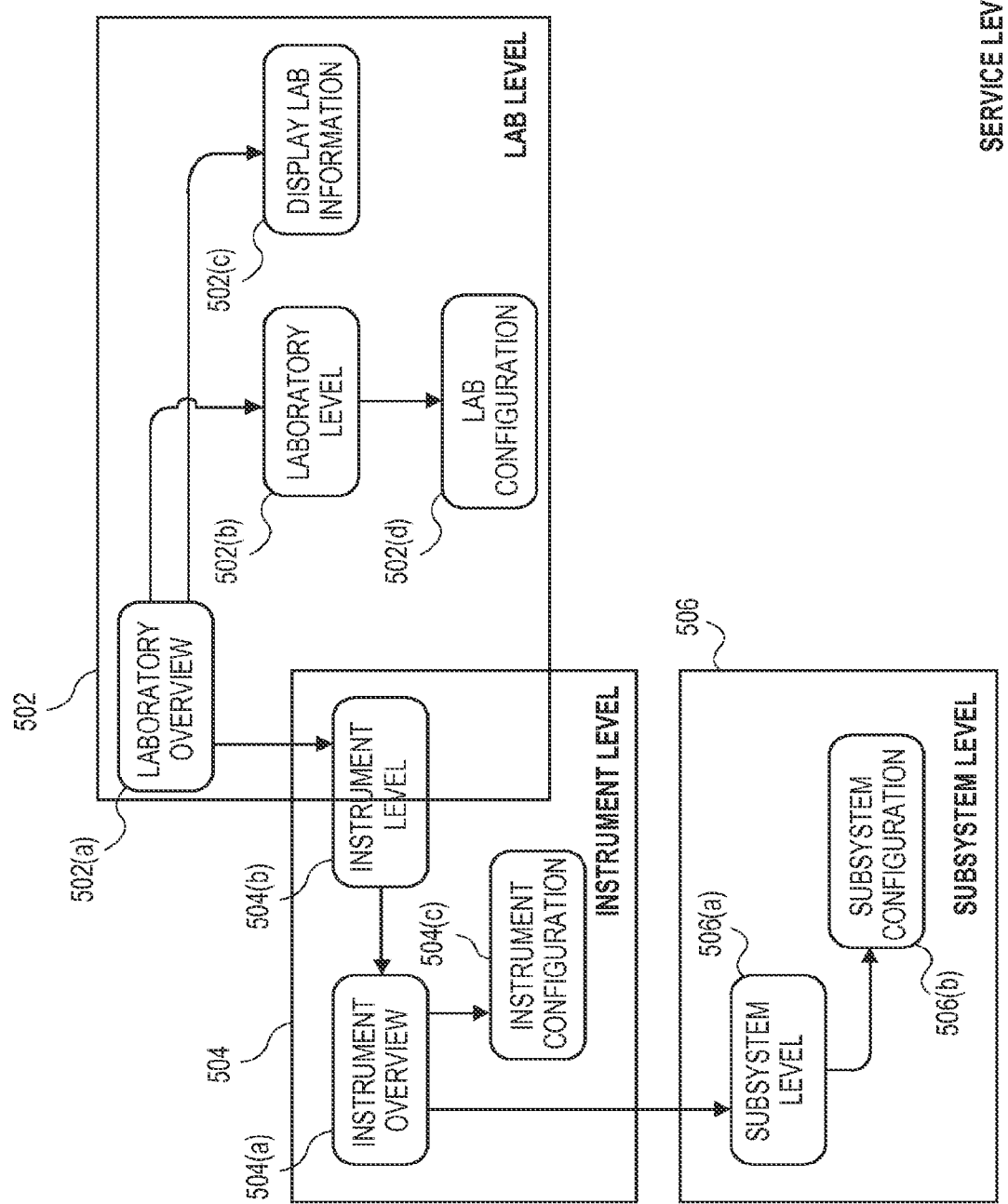
FIG. 3 shows a diagram of various level interfaces.

A special role can be assigned to a service level by having the possibility to access any subsystem, instrument or central laboratory overview from a mobile device, such as a laptop. The different levels are shown in FIG. 3. As shown in FIG. 3, the laboratory level 502 can include a laboratory overview portion 502(*a*), which can drill down to a laboratory level 502(*b*) or display tab information 502(*c*). The laboratory level 502(*b*) may also access a laboratory configuration 502(*d*). The laboratory overview 502(*a*) may also access an instrument level interface 504(*b*) in the instrument level 504. The instrument level interface 504(*b*) can access an instrument overview interface 504(*a*), which can access an instrument configuration interface 504(*c*) and a subsystem level interface 506(*a*) in the subsystem level 506. The subsystem level interface 506(*a*) may access a subsystem configuration interface 506(*b*).

At the laboratory level 502, the GUI architecture can provide at least two design elements that can help the user interface with the system at the laboratory level 502. They may include a TV screen client and a review client.

This level 502 only provides user level access to the control layers. The TV screen client can be a display only device connected to the WML 50(*b*). It can show an overview of the lab such as status of instruments connected to the WML 50(*b*), sample status that can be filtered to display only those that are of interest, and instrument error messages.

The review client can be open to all access levels of the control layers. The review client allows access to the laboratory level view of the laboratory. From the review client, it is possible to configure the TV client. Further, error messages or other alerts, and the state and status of each instrument connected to the WML 50(*b*) can be viewed here. It can have a configuration wizard to set up the lab environment and provide links to the physical instruments. Here, the user interface can drill down to view status at the instrument and subsystem levels.

While the laboratory level 502 is concerned with all connected and non-connected instruments and LAS connected to the WML 50(*b*), the instrument level 504 can only be concerned with one specific LAS in some embodiments. The GUI architecture provides two design elements, an instrument client and a service client, that help the user interface with the system at the instrument level 60.

The instrument client allows each user access level to manage the LAS from an instrument level 504. This client is used as the GUI for the PCL. The instrument client acts as a remote user interface to the PCL allowing the user to view status and make configuration changes. The PCL needs to present status information to the instrument client about errors, subsystem status, consumables, etc. and the instrument client can send commands to the PCL to pause subsystems, recover from errors, and modify configuration settings. In some cases, the PCL and instrument client can reside on the same computational apparatus, but could be run in different processes.

This level allows navigating down to view read-only views of the subsystem level 506. It also allows display state information and any instrument error messages relevant to the specific subsystems that are part of the LAS. It also performs instrument routine operations, performs error recovery at the instrument level 504, instrument level initialization, instrument configuration tasks, and backup and restore operations.

The service client provides service and super user access to service functions across each level of the LAS. The service client can run on a service laptop or other computational device.

This level allows navigation down to view read only views of the subsystem level 506. It also allows the display of state information and any instrument error messages relevant to the specific subsystems that are part of the LAS.

It also performs instrument routine operations, error recovery at the instrument level 504, instrument level initialization, instrument configuration tasks, and backup/restore operations.

This level will be responsible for each individual subsystem on the LAS. The subsystem user interface may show the state of a subsystem along with error information when errors occur, and possibly error recovery videos to assist in the recovery process. Users can perform some basic subsystem configuration tasks using the subsystem user interface, for instance modifying the active base frame configuration at an input or output.

The GUI architecture provides two design elements, a frame client and a service client, that help the user interface with the system at the subsystem level.

The frame client is specific to the particular subsystem that was requested to be displayed. With each frame client, there can be parts of the GUI that are common between all frame clients. This commonality can be grouped within a common frame client and the non-common portions will be part of the subsystem specific frame client.

The frame client can display the current subsystem, the current subsystem state, alert conditions and the location on subsystem the user needs to pay attention to. The frame client may also display supply or waste status of tubes on the subsystem.

The service client can allow the service or administration user to perform the following service type functions: (1) instrument command functions—start, stop the subsystem, initialize the subsystem; (2) open/close drawers; (3) exchange racks; (4) replace supplies or remove waste; (5) perform error recovery; (6) perform subsystem configuration; (7) perform system teach functions; (8) alignment procedures; (9) backup/restore functions; (10) maintenance procedures for the subsystem; (11) diagnostic features; (12) system exerciser functions; and (13) performance verification tests.

In the management architecture system, errors and operational events are generalized as "events." The management architecture employs a single mechanism in handling events, the event alert object (EAO)—regardless of whether the events are system errors or operational events.

Some of the events that an LAS or analyzer encounters are truly errors (e.g., robotic motion error, stuck carrier, etc.) while some events are operational events and are part of the normal operation of the system (e.g., dispose decapper waste, unload full trays, refill aliquot tips) and are not errors. Operational events behave similarly to an error such that the user needs to be notified of the event. The user might require additional instructions to recover from the operational event. Once recovery from the operational event is completed, corresponding notifications displayed on the GUI needs to be cleared.

The event alert object contains the event or alert data and is used as the transport mechanism between the lab, instrument and subsystem levels. It will specify at which level the alert will be displayed and where error recovery will be performed. The following sections describe the behavior of error recovery for each architectural level of the management architecture.

At this level all laboratory or sample events can be viewed. Event/error notifications displayed at this level will indicate which level will perform the error recovery. For sample based errors, the WML can generate a process plan to potentially route the sample to an error location, if the processing for the tube is in question as a result of the error or event. Also, error conditions requiring the WML to generate a new process plan will be forwarded to the WML. The new process plan will then be sent down to the instrument level.

For non-sample based errors, failures with the WML or with communications between the WML and the instrument level would cause samples to be held where they are, or complete processing at the analyzer they are running in and then held at the current subsystem until connection with the WML is re-established. If connection is not re-established (i.e. after some given time-out), the instrument level can instruct the subsystem level to complete route legs, if possible, otherwise route tubes to an error location.

Automation specific events will be viewable from this level. Event/error notifications displayed at this level can indicate which level can perform the error recovery.

For sample based errors, a tube state information message can be sent to the WML to indicate an error or event has occurred that prevents it from satisfying the current process plan. Also, the WML will then either send a new process plan to route the tube to an error location or some other new destination. The instrument level can also display error notifications generated by the subsystem level for errors that do not require a process plan be generated.

For non-sample based errors, failures with the instrument level or with communications between the instrument level and the subsystem level. The sample will complete current processing at the current subsystem. Once connection is re-established the tube state information is sent to the instrument level which forwards that on to the WML. Either the current process plan is used if satisfactory, or a new process plan is generated. The process plan is then executed as normal. If connection is not re-established, the sample waits at the current subsystem.

Events specific to a subsystem will be viewable at the subsystem level. Event/error notifications displayed at this level will indicate which level will perform the error recovery.

For sample based errors, if the MCL detects an error with a sample tube that prevents it from being routed (either because it cannot satisfy it for some reason or the tube is unknown or at an unexpected location), it will generate a tube state information message to be sent to the WML via the instrument level. The WML can then generate a new process plan to route the tube either to a new destination or to an error location. If there is an error that does not involve routing of a sample, the subsystem level will notify the instrument level, which in turn will notify the user. The instrument level may also pause the LAS if necessary For non-sample based errors, if the subsystem restarts, it will send cached messages to the instrument level. Samples with known states can be processed. The instrument level can send a tube state information message for each sample to the WML. If a new process plan is received, it can be processed. Otherwise, the current process plan can be used. Further, the subsystem client can prompt the user as to whether to continue processing the sample or send it to the SIQ (sample in question). Continuing processing will generate a tube state information message indicating successful completion. Sending it to the SIQ will send a tube state information message indicating completion with errors. If a sample is sent by any reason to the SIQ buffer, a message is sent to the WML indicating the reason, for instance "too low volume for centrifugation" or "barcode not readable" etc.

Figure 4:
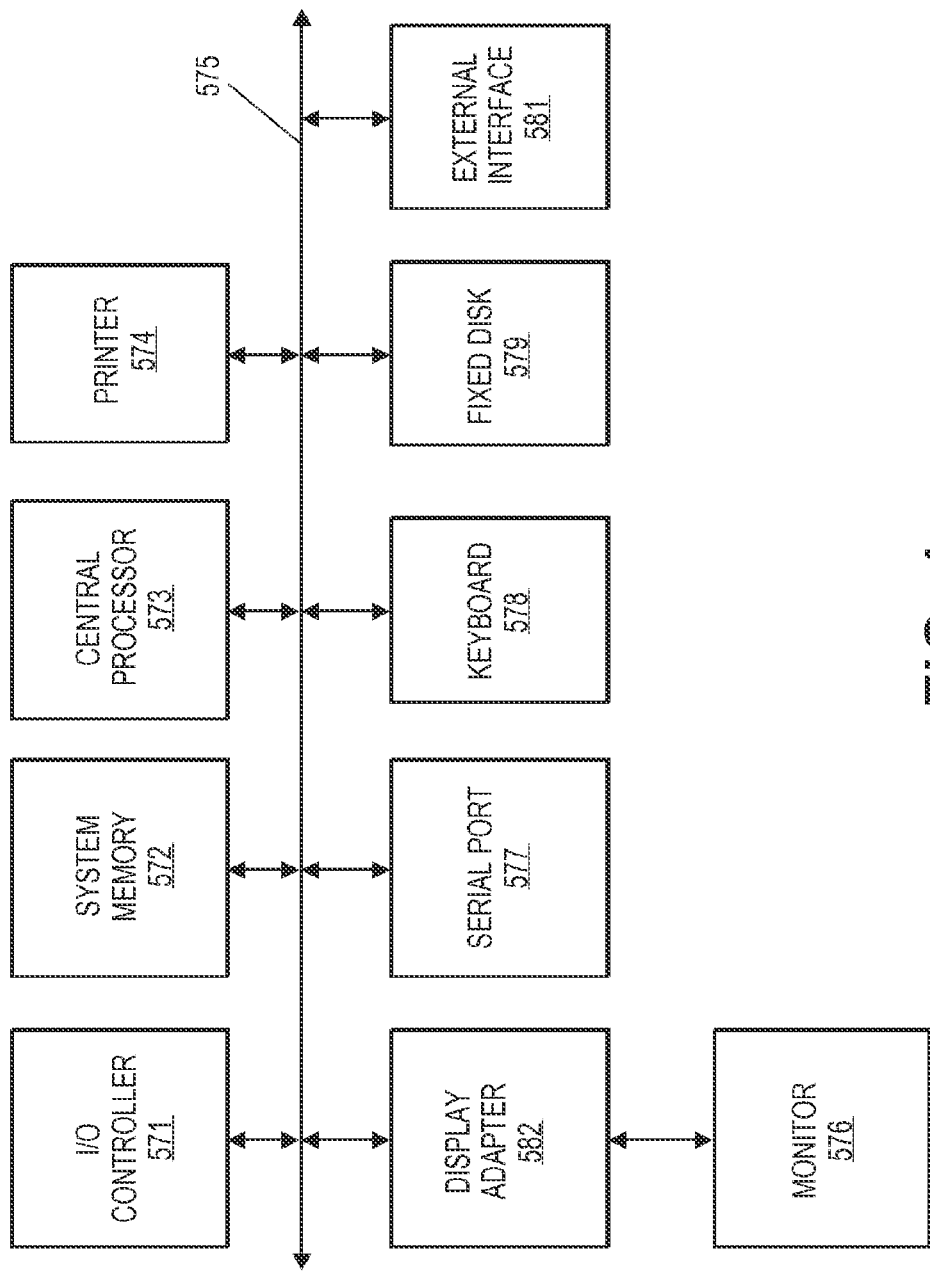
FIG. 4 shows a block diagram of a computer apparatus.

FIG. 4 is a block diagram of elements that may be present in a computing apparatus configured to execute a method or operation in accordance with some embodiments of the invention. The elements in FIG. 4 may be used in any of the components shown in FIGS. 1A, 1B, 1C, etc. The subsystems shown in FIG. 4 are interconnected via a system bus 575. Additional subsystems such as a printer 574, a keyboard 578, a fixed disk 579, a monitor 576, which is coupled to a display adapter 582, and others are shown. Peripherals and input/output (I/O) devices, which couple to an I/O controller 571, can be connected to the computing system by any number of means known in the art, such as a serial port 577. For example, the serial port 577 or an external interface 581 can be used to connect the computing device to a wide area network such as the Internet, a mouse input device, or a scanner. The interconnection via the system bus 575 allows a programmed central processor 573 (e.g., a microprocessor, CPU, etc.) to communicate with each subsystem and to control the execution of instructions that may be stored in a system memory 572 or the fixed disk 579, as well as the exchange of information between subsystems. The system memory 572 and/or the fixed disk 579 may embody a computer-readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. An automated sample processing system comprising:
   a workflow management controller having a first processor and a first computer readable medium, the workflow management controller including a workflow management layer configured to, for each sample from a plurality of samples:
   generate a process plan for that sample; and
   send the process plan for that sample to a corresponding laboratory automation system controller;
   a first laboratory automation system controller coupled to the workflow management controller and being a first part of the automated sample processing system, the first laboratory automation system controller having a second processor, and a second computer readable medium, wherein the first laboratory automation system controller operates a first process control layer and a first middle control layer, wherein the first laboratory automation system controller is in communication with a first plurality of subsystems and the first plurality of subsystems include a first plurality of instruments for processing a first plurality of samples, wherein the first process control layer is configured to, based on receiving a process plan for a sample for which the first laboratory automation system controller is the corresponding laboratory automation system controller, determine a route for the sample for which the first laboratory automation system controller is the corresponding laboratory automation system controller, wherein the route specifies one or more instruments from the first plurality of instruments for carrying out the process plan, and wherein the first middle control layer is configured to control the operation of the first plurality of subsystems including the first plurality of instruments for the processing of the first plurality of samples according to routes determined by the first process control layer; and
   a second laboratory automation system controller coupled to the workflow management controller and being a second part of the automated sample processing system, the second laboratory automation system controller having a third processor, and a third computer readable medium, wherein the second laboratory automation system controller operates a second process control layer and a second middle control layer, wherein the second laboratory automation system controller is in communication with a second plurality of subsystems and the second plurality of subsystems include a second plurality of instruments for processing a second plurality of samples, wherein the second process control layer is configured to, based on receiving a process plan for a sample for which the second laboratory automation system controller is the corresponding laboratory automation system controller, generate a route for the sample for which the second laboratory automation system controller is the corresponding laboratory automation system controller, wherein the route specifies one or more instruments from the second plurality of instruments for carrying out the process plan, and wherein the second middle control layer is configured to control the operation of the second plurality of subsystems including the second plurality of instruments for the processing of the second plurality of samples according to routes determined by the second process control layer.

2. The system of claim 1, wherein the first plurality of instruments and the second plurality of instruments each include two or more of an analyzer, an aliquoter, a robot, an input station, an output station, a decapper, a recapper, a gripper unit, a tube inspection unit (TIU), an LLD, and a centrifuge.

3. The system of claim 1, wherein the first laboratory automation system controller and the second laboratory automation system controller are two of a plurality of laboratory automation system controllers.

4. The system of claim 1, wherein at least the first laboratory automation system controller and the workflow management controller are configured to operate independently of each other.

5. The system of claim 1, wherein the first process control layer and the first middle control layer are software layers stored in the second computer readable medium and the second process control layer and the second middle control layer are software layers stored in the third computer readable medium.

6. The system of claim 1, wherein the first process control layer is configured to receive a sample container data from the first middle control layer.

7. The system of claim 1, wherein controlling the first plurality of subsystems including the first plurality of instruments for processing the first plurality of samples according to routes determined by the first process control layer comprises coordinating common resources shared by multiple different subsystems from the first plurality of subsystems.

8. The system of claim 1, wherein:
for each sample from the plurality of samples, the process plan for that sample comprises a plurality of routes for that sample; and
the first process control layer is configured to determine the route for the sample for which the first laboratory automation system controller is the corresponding laboratory automation system controller by selecting a route from the plurality of routes comprised by the process plan for the sample for which the first laboratory automation system controller is the corresponding laboratory automation system controller.

9. The system of claim 1, wherein, for each sample from the plurality of samples:
the workflow management layer is configured to receive an arrival notification for that sample from a process control layer comprised by the corresponding laboratory automation system controller for that sample; and
the workflow management layer is configured to generate the process plan for that sample based on receiving the arrival notification for that sample.

10. The system of claim 1, wherein:
the first process control layer is configured to, after the sample for which the first laboratory automation system controller is the corresponding laboratory automation system controller is processed by an instrument from the first plurality of instruments, send updated sample tube information for that sample to the workflow management layer; and
the workflow management layer is configured to, for each sample from the plurality of samples:
upon receiving updated sample tube information for that sample, regenerate the process plan for that sample; and
send the regenerated process plan for that sample to the corresponding laboratory automation system controller for that sample.

11. A computer apparatus comprising:
a workflow management controller including at least a first processor and a memory device storing a software component, executable by the first processor, the software component comprising a workflow management layer configured to, for each sample from a plurality of samples:
generate a process plan for that sample; and
send the process plan for that sample to a corresponding laboratory automation system controller;
a first laboratory automation system controller coupled to the workflow management controller, the first laboratory automation system controller having a second processor, and a second computer readable medium, wherein the first laboratory automation system controller operates a first process control layer and a first middle control layer, wherein the first process control layer and the first middle control layer are software layers stored in the second computer readable medium, wherein the first process control layer is configured to, based on receiving a process plan for a sample for which the first laboratory automation system controller is the corresponding laboratory automation system controller, break down the process plan from the workflow management layer and use the process plan from the workflow management layer to generate a plurality of route legs for the sample for which the first laboratory automation system controller is the corresponding laboratory automation system controller, and wherein the second processor and the first middle control layer are configured to control operations of a first plurality of subsystems including a first plurality of instruments along the plurality of route legs for the sample for which the first laboratory automation system controller is the corresponding laboratory automation system controller; and
a second laboratory automation system controller coupled to the workflow management controller, the second laboratory automation system controller having a third processor, and a third computer readable medium, wherein the second laboratory automation system controller operates a second process control layer and a second middle control layer, wherein the second process control layer and the second middle control layer are software layers stored in the third computer readable medium, wherein the second process control layer is configured to, based on receiving a process plan for a sample for which the first laboratory automation system controller is the corresponding laboratory automation system controller, break down the process plan from the workflow management layer and use the process plan from the workflow management layer to generate a plurality of route legs for the sample for which the second laboratory automation system controller is the corresponding laboratory automation system controller, and wherein the third processor and the second middle control layer are configured to control operations of a second plurality of subsystems including a second plurality of instruments along the plurality of route legs for the sample for which the first laboratory automation system controller is the corresponding laboratory automation system controller.

12. The computer apparatus of claim 11, wherein the first laboratory automation system controller and the second laboratory automation system controller are two of a plurality of laboratory automation system controllers.

13. The computer apparatus of claim 11, wherein at least the first laboratory automation system controller and the workflow management controller are configured to operate independently of each other.

14. The system of claim 11, wherein the first middle control layer selects one or more of the first plurality of instruments that will achieve a fastest possible processing.

15. The system of claim 11, wherein controlling operations of the first plurality of subsystems including the first plurality of instruments along the plurality of route legs comprises coordinating common resources shared by multiple different subsystems from the first plurality of subsystems.

16. A computer apparatus comprising:
a workflow management controller including at least a first processor and a memory device storing a software component, executable by the first processor, the software component comprising a workflow management layer configured to generate a process plan comprising a plurality of routes;

a first laboratory automation system controller coupled to the workflow management controller, the first laboratory automation system controller having a second processor, and a second computer readable medium, wherein the first laboratory automation system controller operates a first process control layer and a first middle control layer, wherein the first process control layer and the first middle control layer are software layers stored in the second computer readable medium; and a second laboratory automation system controller coupled to the workflow management controller, the second laboratory automation system controller having a third processor, and a third computer readable medium, wherein the second laboratory automation system controller operates a second process control layer and a second middle control layer, wherein the second process control layer and the second middle control layer are software layers stored in the third computer readable medium;

wherein the first process control layer selects an optimized route in the plurality of routes, wherein the first process control layer is configured for reviewing and evaluating at least some samples waiting to be processed, and wherein the first process control layer divides the selected optimized route into a plurality of route legs, wherein at least the second processor and the first middle control layer cause a sample to be processed by a first plurality of subsystems autonomously, without interaction with the first process control layer.

17. The computer apparatus of claim 16, wherein at least the third processor and the second middle control layer are configured to cause a second sample to be processed by a second plurality of subsystems autonomously, without interaction with the second process control layer optimize a portion of an optimized route to reduce a number of scheduling requests by the second middle control layer to the second process control layer.

18. The computer apparatus of claim 16, wherein the first laboratory automation system controller and the second laboratory automation system controller are two of a plurality of laboratory automation system controllers.

19. The computer apparatus of claim 16, wherein at least the first laboratory automation system controller and the workflow management controller are configured to operate independently of each other.

20. The computer apparatus of claim 16, wherein the first plurality of subsystems include a first plurality of instruments for processing a sample, and wherein the first plurality of instruments includes two or more of an analyzer, an aliquoter, a robot, an input station, an output station, a decapper, a recapper, a gripper unit, a tube inspection unit (TIU), an LLD, and a centrifuge.

* * * * *